US008485828B2

(12) United States Patent
Cork et al.

(10) Patent No.: US 8,485,828 B2
(45) Date of Patent: Jul. 16, 2013

(54) METHODS AND SYSTEMS FOR BLOOD COLLECTION OPERATOR TRAINING

(75) Inventors: William H. Cork, Lake Bluff, IL (US); Daryl Richard Calhoun, Gurnee, IL (US)

(73) Assignee: Fenwal, Inc., Lake Zurich, IL (US)

( * ) Notice: Subject to any disclaimer, the term of this patent is extended or adjusted under 35 U.S.C. 154(b) by 158 days.

(21) Appl. No.: 13/209,163

(22) Filed: Aug. 12, 2011

(65) Prior Publication Data

US 2012/0040321 A1 Feb. 16, 2012

Related U.S. Application Data

(60) Provisional application No. 61/448,654, filed on Mar. 2, 2011, provisional application No. 61/383,174, filed on Sep. 15, 2010, provisional application No. 61/373,197, filed on Aug. 12, 2010.

(51) Int. Cl.
*G09B 23/00* (2006.01)

(52) U.S. Cl.
USPC .......................................................... 434/262

(58) Field of Classification Search
CPC ....................................................... G09B 23/00
USPC ......................................................... 434/262
See application file for complete search history.

(56) References Cited

U.S. PATENT DOCUMENTS

| | | | |
|---|---|---|---|
| 6,613,566 B2 * | 9/2003 | Kandler et al. ............... | 435/372 |
| 8,255,238 B2 * | 8/2012 | Powell et al. ....................... | 705/3 |
| 2009/0259408 A1 * | 10/2009 | Mishima et al. ................ | 702/19 |
| 2012/0041777 A1 * | 2/2012 | Case et al. ......................... | 705/2 |
| 2012/0271655 A1 * | 10/2012 | Knobel et al. ..................... | 705/3 |

\* cited by examiner

*Primary Examiner* — Kesha Y. Frisby
(74) *Attorney, Agent, or Firm* — Hanley, Flight & Zimmerman, LLC

(57) ABSTRACT

Certain examples provide systems/apparatus, methods, and articles of manufacture for blood collection/processing instrument operator training and troubleshooting. Certain examples provide a system for platelet resuspension training. The system includes an interactive training application, provided via a mobile device, to train a user to resuspend platelets in a liquid medium prior to its storage and/or transfusion to a patient. The training application is to instruct the user regarding an appropriate motion and vigor for resuspension of platelets in a blood container associated with a blood processing instrument. The system includes a sensor to detect the user's motion of the mobile device. The system includes a processor to compare the user's motion of the mobile device to the appropriate motion and vigor for resuspension of platelets in a blood container and provide feedback to the user regarding the comparison.

34 Claims, 6 Drawing Sheets

METHODS AND SYSTEMS FOR BLOOD COLLECTION OPERATOR TRAINING

CROSS-REFERENCE TO RELATED APPLICATIONS

The present application relates and claims priority to U.S. provisional patent application Ser. No. 61/373,197, filed on Aug. 12, 2010, U.S. provisional patent application, Ser. No. 61/383,174, filed on Sep. 15, 2010, and U.S. provisional patent application, Ser. No. 61/448,654, filed on Mar. 2, 2011, each of which is herein incorporated by reference in its entirety.

TECHNICAL FIELD

The present invention relates generally to methods, systems, and apparatus to provide mobile applications for blood centers and associated medical personnel.

BACKGROUND

Hospitals, clinics, and other healthcare providers continually face a need for donated blood to help in treating patients. It is often difficult to notify and educate the public regarding donations. Donors may not become repeat donors due to a lack of information and access. Additionally, it is sometimes difficult to train operators and administrators regarding the particularities of blood collection instruments. Operators and administrators may introduce inefficiencies in their operation and management of blood collection instruments due to a lack of information and access.

BRIEF SUMMARY

Certain examples provide systems/apparatus, methods, and articles of manufacture for blood collection/processing instrument operator training and troubleshooting.

Certain examples provide a computer-implemented method of training an operator for platelet resuspension. The method includes providing an interactive training application via a mobile device to train a user to resuspend platelets in a liquid medium prior to its storage and/or transfusion to a patient. The training application is to instruct the user regarding an appropriate motion and vigor for resuspension of platelets in a blood container associated with a blood processing instrument. The method includes detecting, using a sensor, the user's motion of the mobile device. The method includes comparing the user's motion of the mobile device to the appropriate motion and vigor for resuspension of platelets in a blood container. The method includes providing feedback to the user regarding the comparison.

Certain examples provide a system for platelet resuspension training. The system includes an interactive training application, provided via a mobile device, to train a user to resuspend platelets in a liquid medium prior to its storage and/or transfusion to a patient. The training application is to instruct the user regarding an appropriate motion and vigor for resuspension of platelets in a blood container associated with a blood processing instrument. The system includes a sensor to detect the user's motion of the mobile device. The system includes a processor to compare the user's motion of the mobile device to the appropriate motion and vigor for resuspension of platelets in a blood container and provide feedback to the user regarding the comparison.

Certain examples provide a tangible computer readable storage medium including program code for execution by a processor. The program code, when implemented, is to provide an interactive training application, provided via a mobile device, to train a user to resuspend platelets in a liquid medium prior to its storage and/or transfusion to a patient. The training application is to instruct the user regarding an appropriate motion and vigor for resuspension of platelets in a blood container associated with a blood processing instrument. The program code, when implemented, is to provide a processor to receive information regarding the user's motion of the mobile device from a sensor and to compare the user's motion of the mobile device to the appropriate motion and vigor for resuspension of platelets in a blood container and provide feedback to the user regarding the comparison.

Figure 1:
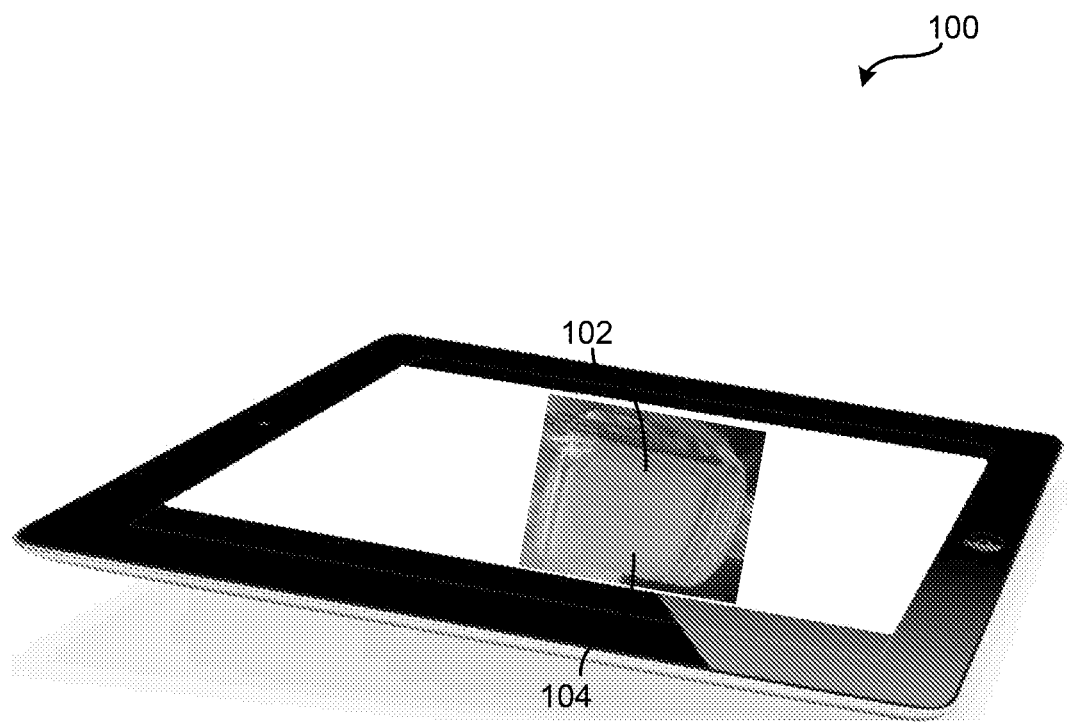
FIGS. 1-3 depict an example mobile device on which the examples described herein can be implemented.

The following detailed description of certain examples will be better understood when read in conjunction with the appended drawings. For the purpose of illustrating the examples described herein, certain examples are shown in the drawings. It should be understood, however, that the present disclosure is not limited to the arrangements and instrumentality shown in the attached drawings.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

It will be understood that the present invention may be embodied in other specific forms without departing from the spirit thereof. The present examples and embodiments, therefore, are to be considered in all respects as illustrative and not restrictive, and the invention is not to be limited to the details presented herein.

Although the following discloses example methods, apparatus, systems, and articles of manufacture including, among other components, firmware and/or software executed on hardware, it should be noted that such methods, apparatus, systems and articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

Certain examples provide mobile applications for blood centers that include donor, administration, operations, and/or service applications. Certain examples converge information into one or more applications that help provide or facilitate training, improved record keeping, better donor experience, reduction of waste, and/or enhanced ease of use for the user, for example. In addition, flow of communication can be improved. Furthermore, certain examples help provide for automation of manual tasks which help eliminate or reduce potential user errors.

Certain examples generally relate to the resuspension of blood platelets and/or platelet concentrates after separation of the platelets or platelet concentrate from the blood of a donor. More specifically, certain examples concern platelet suspensions, media in which platelets may be resuspended, the suspension of platelets in such media, and methods for obtaining or preparing such suspensions.

Whole blood is made up of various cellular components such as red cells, white cells and platelets suspended in its liquid component, plasma. Whole blood can be separated into its constituent components (e.g., cellular or liquid), and the separated component can be administered to a patient in need of that particular component. For example, platelets can be removed from the whole blood of a healthy donor, collected, and later administered to a cancer patient, whose ability to make platelets has been destroyed by chemotherapy or radiation treatment.

Platelets may be collected by continuously or intermittently introducing whole blood from a donor into a centrifuge chamber wherein the whole blood is separated into its constituent components, including platelets, based on the densities of the different components. In the separation of platelets, sometimes referred to as plateletpheresis, the platelets are often concentrated to form a layer of packed platelets with some residual plasma (hereinafter "platelet concentrate"). For storage and/or transfusion to the patient, however, the platelet concentrate is to be resuspended in a liquid medium, such as plasma, a platelet additive solution (PAS), etc.

Plateletpheresis may be facilitated using an instrument or device such as the Amicus™ Separator, an automated continuous flow blood cell separator made by Fenwal, Inc. In the Amicus™ separator, red blood cells and white blood cells are separated from platelet-rich plasma in a first stage, and the platelet-rich plasma is then separated into platelet poor plasma and platelet concentrate in a second stage. The collected platelet concentrate is resuspended in additional plasma, for example.

In addition to the automated procedure described above, platelets can also be collected on systems where the donor is not connected to the instrument during the plateletpheresis procedure. In these "manual" systems, whole blood is collected from a donor. The container of collected whole blood is then centrifuged to separate the platelet rich plasma in a first stage from the other components. In a second stage of the procedure, platelets are separated from plasma to form a platelet concentrate. The platelet concentrate is then resuspended in a liquid, such as plasma.

Although plasma is effective for resuspending platelets, it may not be a chosen medium for platelet resuspension for several reasons. First, plasma itself is a valuable blood component that can be used or further processed for use in the treatment of patients with other disorders. Thus, a user may wish to save the plasma for end uses other than platelet resuspension. Second, platelets often do not completely resuspend in plasma and/or complete resuspension of platelets in plasma occurs over an extended period of time.

Platelets that have not completely resuspended may be unsuitable for further processing or transfusion because of the presence of platelet aggregates (e.g., clumps of platelets). Platelet aggregates are undesirable because they can clog transfusion filters commonly used in platelet transfusions and/or platelet processing, such as filters designed for removal of white cells. Lower throughput because of clogged filters results in fewer platelets administered to a patient.

Platelets may be resuspended, for example, in saline solution (e.g., 0.9% NaCl), and saline may be used to resuspend platelets in platelet washing procedures. Solutions that are primarily intended for the storage of platelets may also be useful for resuspending platelets. In addition to sodium chloride, these solutions include other components designed to help preserve the platelets such as sodium citrate, mannitol, phosphate, potassium chloride, sodium acetate which serves as a nutrient for platelets. In certain examples, one or more platelet additive solutions (e.g., PAS I, PAS II or T-Sol, PAS III or Fenwal's InterSol™ solution, etc.) may be used to assist in suspension and storage of platelets.

In certain examples, an application can provide training, feedback, monitor, and status information on a collection process. For example, an application on a mobile or handheld computing device (e.g., an Apple iPad™, iPhone™, and/or other tablet computer or smartphone) can help facilitate user training with respect to one or more blood collection and/or processing procedures. For example, use of equipment and supplies may be facilitated.

In certain examples, a customer may purchase an application and/or download the application to a device. Materials may be provided to explain the application, provide directions for downloading/installing the application onto a phone, and/or explain how to use the application. In some examples, an application can give visual assistance in operating a device such as Fenwal's Alyx™ or Amicus™ collection instruments. In some examples, the application may provide a mobile version of the operator's manual for Alyx™ system and/or Amicus™ separator.

In some examples, an application may make provider websites mobile-friendly. For example, Microsoft SharePoint™ supports mobile views and can be leveraged to provide a mobile-friendly provider (e.g., Fenwal) website.

In some examples, an application for use with a mobile device is integrated with a provider (e.g., Fenwal) data management system. In some examples, the application enables the device to be made 21 CFR part 11 compliant. In some examples, the application can be used across a variety of blood products.

In some examples, an interactive application teaches or trains users regarding operation of blood collection/processing equipment and/or how automated Fenwal technologies or other provider technologies are designed to maximize the collection of platelets (e.g., on Amicus™ separators), plasma (e.g., on Autopheresis-C™ systems) and/or red cells (e.g., on Alyx™ systems). This application may also include information regarding how the automated devices function. In some examples, the application may describe how the device(s) draw the donor blood in, separate it into the various components and return the unnecessary components back to the donor.

Certain examples described herein relate to example systems and methods for training operators in the blood collection field to properly resuspend platelets in a liquid medium, such as plasma, saline, saline and anticoagulant, PAS, etc., prior to its storage and/or transfusion to a patient. Certain examples provide a practice forum for training operators regarding the appropriate motion and vigor for resuspension of platelets. Certain examples provide feedback to allow an operator to practice and experience resuspension of platelets in a blood container associated with a blood collection device.

Using a blood collection device, such as an Amicus™ separator, concentrated platelets are collected within a container housed within a centrifuge. After centrifugation, plasma may be introduced into the container and an operator may then resuspend the platelets by holding the container taut between their hands and shaking the container back and forth to detach and, thus, resuspend platelets that are affixed and/or attached to the sides of the container. Platelets may also be attached to each other (sometimes referred to as a pellet) and could benefit from resuspension. After resuspension, the platelet/plasma solution may be transferred to a storage container along with additional plasma and/or storage fluid, for example. If the operator does not properly resuspend the platelets by not shaking the container properly or for a sufficient time, some of the platelets may not be resuspended and, thus, not be transferred to the storage container, for example. If the operator does not properly resuspend the platelets by rubbing of the container or pinching the corners of the container, some or all of the platelets may be activated within the container causing them to clot, for example.

Using the examples described herein, a tutorial application may be implemented on a mobile device having an accelerometer to teach an operator how to properly resuspend platelets. The tutorial application may facilitate and/or cause the accelerometer to be set at a particular sensitivity that accurately identifies movement of the mobile device during a platelet resuspension tutorial. The particular sensitivity may be the same or different than the setting at which the accelerometer typically operates. The tutorial application may facilitate and/or cause the mobile device to visually display on its monitor the progress of the platelets being resuspended. For example, initially a container having platelets affixed to its sides or pelletized to each other may be displayed. As the mobile device is moved back and forth during the tutorial (e.g., by an employee of a blood donation center, hospital, plasma center, etc.), the plasma may be shown moving within the container and the platelets may be shown being resuspended. The tutorial application may facilitate and/or cause the mobile device (e.g., using its touch screen and/or other sensor(s)) to identify if the operator is properly holding and/or moving the device during the tutorial. In certain examples, the tutorial application may facilitate and/or cause the mobile device to display a game that advances based on the progress made with regards to resuspending the platelets.

In some examples, the tutorial application may facilitate and/or cause the mobile device to display information relating to suggestions that may improve the operator's performance with regards to resuspending platelets. The tutorial application may facilitate and/or cause the mobile device to display information relating to a comparison between the user's performance and other users at their or other facilities. In some examples, the tutorial application may facilitate and/or cause the mobile device to convey information relating to the user's performance to another person, device and/or data store. The person, device and/or data store may be associated with an employer of the user, a third party and/or provider.

Figure 2:
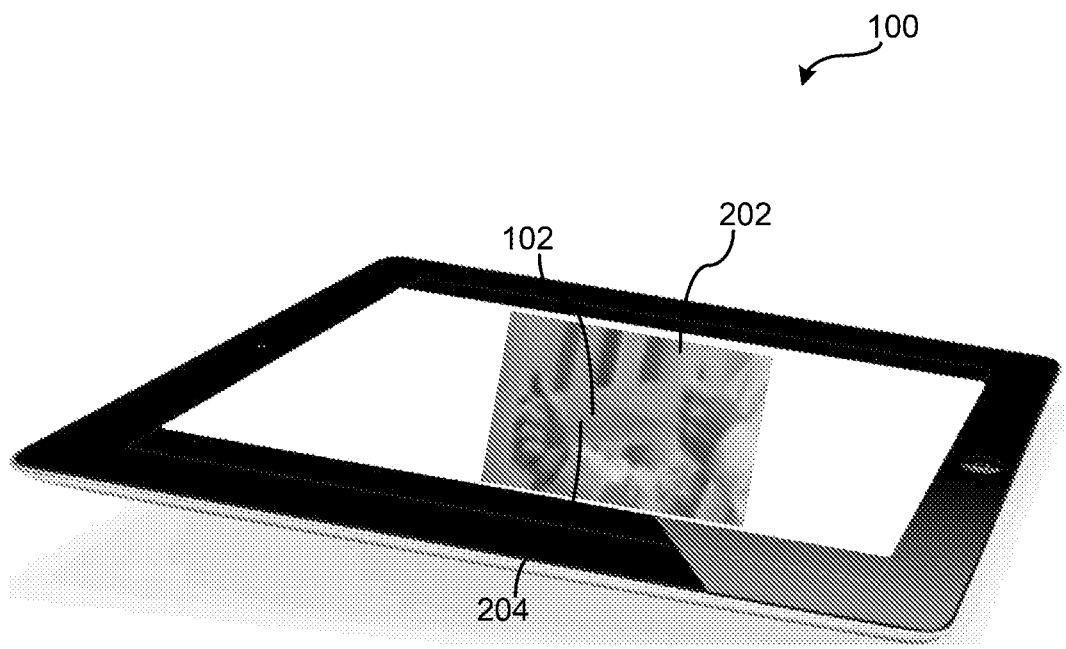
Figure 3:
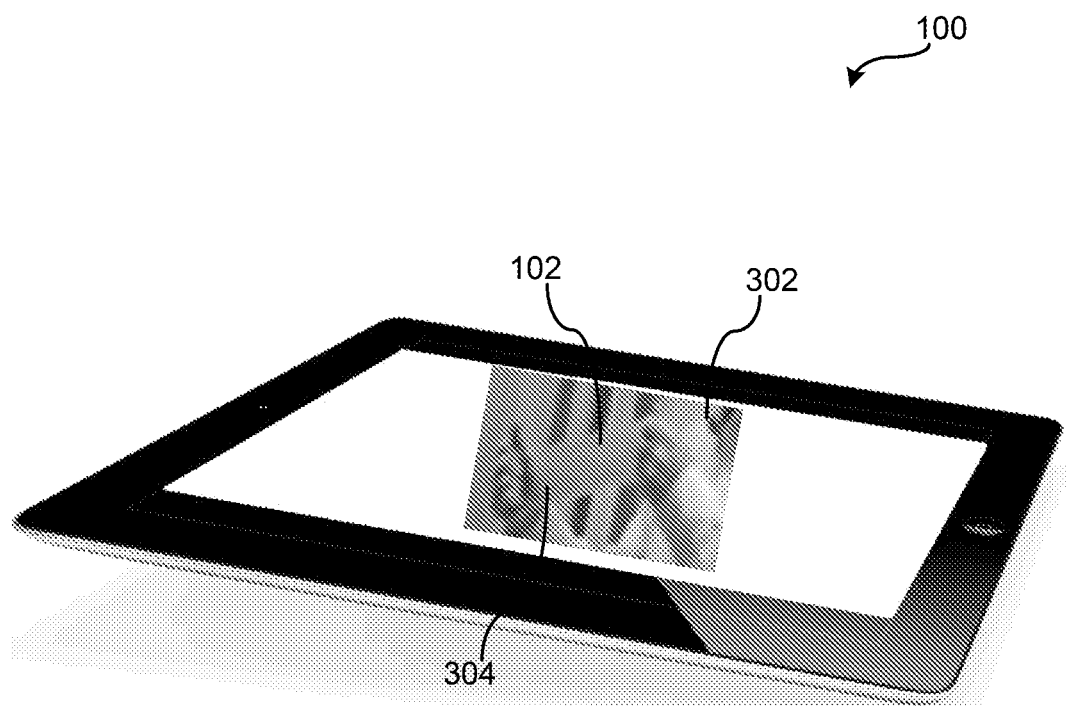

FIGS. 1-3 depict an example mobile device 100 that can be used to implement the examples described herein. In some examples, an example tutorial application may be saved on the mobile device 100 and/or the mobile device 100 may access such a tutorial application using, for example, a wireless internet connection. In such examples, the tutorial application may be available via a web page, cloud based storage, etc. FIG. 1 depicts a centrifuge receptacle 102 after being removed from a collection device. The receptacle 102 includes platelets 104 that may be affixed to side walls of the receptacle 102. The receptacle 102 may be displayed to a user participating in a tutorial on resuspending platelets.

FIG. 2 depicts the mobile device 100 and the blood container and/or centrifuge receptacle 102 being held taut by an instructor at 202. The receptacle 102 being displayed at 202 may be in an as-collected stage and may be displayed for the user to learn one of the stages encountered when resuspending platelets. At such a stage, most if not all platelets 204 may be affixed to the sides of the receptacle 102 and/or pelletized (affixed) to other platelets.

FIG. 3 depicts the mobile device 100 and the blood container and/or centrifuge receptacle 102 being held taut by an instructor at 302. In contrast to the display at 202, the display at 302 may be a properly resuspended product and may be displayed for the user to learn another one of the stages encountered when resuspending platelets. The properly resuspended product may be associated with platelets 204 that were once affixed to the sides of the receptacle 102 and/or pelletized to other platelets being resuspended within a solution (e.g., plasma) 304. In some examples, as the user participates in the tutorial, the display on the mobile device 100 may change based on the stage (e.g., beginning stage, middle stage, end stage, etc.) that the user is at in the platelet resuspension process. In some examples, as the user participates in the tutorial, the display on the mobile device 100 may change to provide feedback to the user. The feedback may be related to helpful tips, critiques on the user's performance, comparison with other user's, etc.

Figure 4:
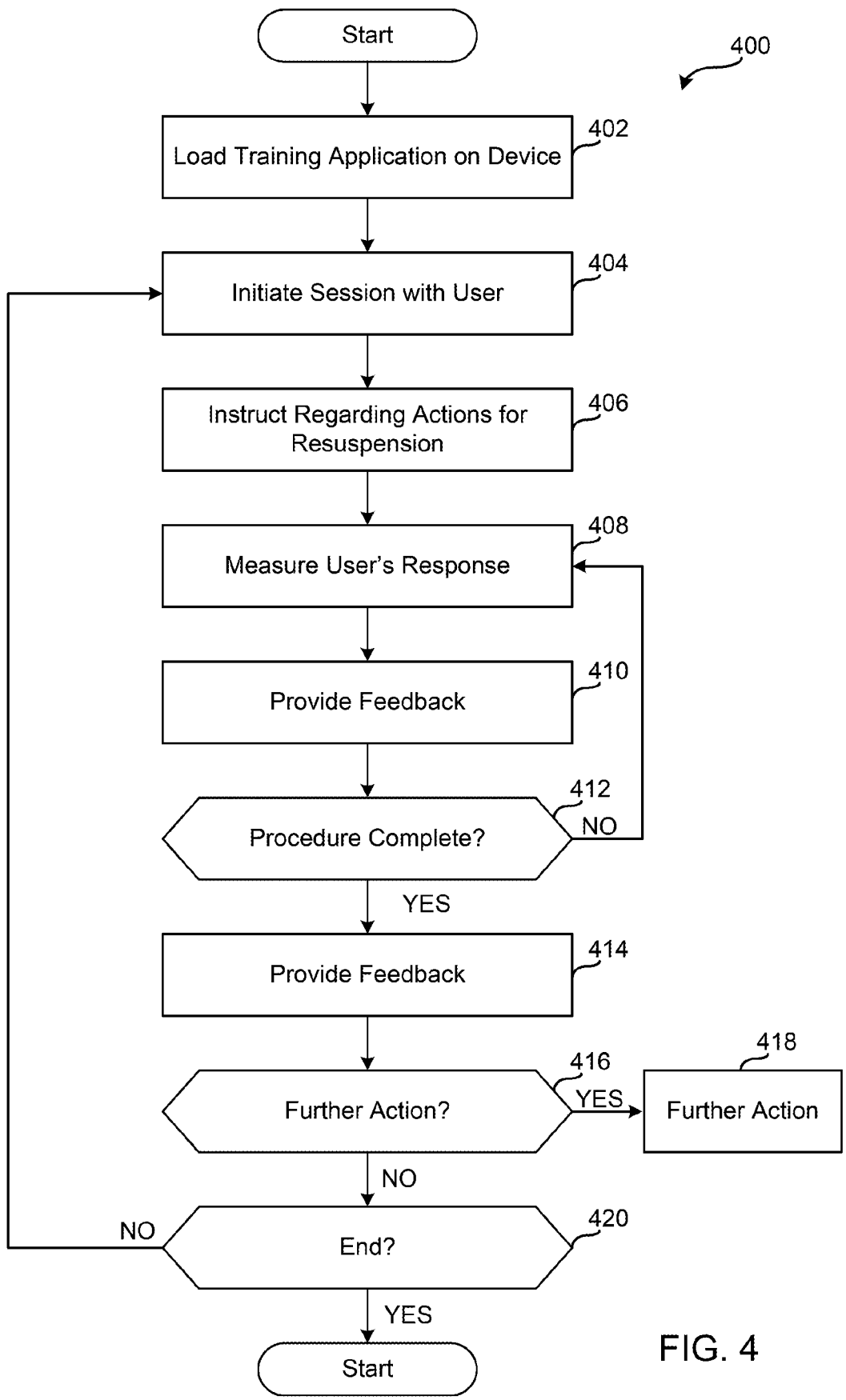
FIG. 4 is a flow diagram of an example method that can be used to implement the examples described herein.

FIG. 4 depicts an example flow diagram representative of processes that may be implemented using, for example, computer readable instructions that may be used during blood collection operator training. The example processes of FIG. 4 may be performed using a processor, a controller and/or any other suitable processing device. For example, the example processes of FIG. 4 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIG. 4 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 4 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 4 may be implemented manually or as any combination(s) of any of the foregoing techniques, for example, any combination of firmware, software, discrete logic and/or hardware. Further, although the example processes of FIG. 4 are described with reference to the flow diagrams of FIG. 4, other methods of implementing the processes of FIG. 4 may be employed. For example, the order of execution of the blocks may be changed, and/or some of the blocks described may be changed, eliminated, sub-divided, or combined. Additionally, any or all of the example processes of FIG. 4 may be performed sequentially and/or in parallel by, for example, separate processing threads, processors, devices, discrete logic, circuits, etc.

The method 400 may begin by loading a training application onto a device such as, a mobile device. Some mobile devices include smart phones (e.g., BlackBerry™, iPhone™, etc.), Mobile Internet Devices (MID), personal digital assistants, cellular phones, handheld computers, tablet computers (iPad™), etc., for example. At block 404, the method 400 initiates a session with a user. The session may be a training course related to a blood collection device, a blood processing device, a procedure to resuspend platelets, etc. The session may be initiated by receiving an input from the user (e.g., a blood collection operator).

At block 406, the method 400 may provide instructions relating to, for example, resuspension of platelets. The instructions may include a video tutorial, step-by-step diagrams, an audio recording, a description, etc. At block 406, the method 400 measures the user's response to the platelet resuspension procedure tutorial. For example, the method 400 may measure and/or monitor if the user is using the appropriate motion to properly resuspend the platelets. The method 400 may measure and/or monitor the vigor in which the user is shaking the mobile device to resuspend the platelets. The method 400 may measure and/or monitor the strength at which the mobile device is being shaken to resuspend the platelets. The method 400 may measure and/or monitor if the user is properly holding the device (e.g., representative of the blood container and/or centrifuge receptacle held taut between the user's hands) based on data/feedback from the device touchscreen. The method 400 may measure and/or monitor if the user is holding and/or shaking the mobile device at the proper angle to simulate resuspending the platelets in a blood component container (e.g., a blood bag). The method 400 may measure and/or monitor if a distance between each back and forth movement is appropriate and/or sufficient to resuspend the platelets, for example.

At block 410, the method 400 provides feedback (e.g., dynamically in real-time or substantially real-time). The feedback may be provided to the user using, for example, the mobile device. The feedback may be provided to an administrator that monitors the user's progress within the training. The feedback may be provided to a third party (e.g., Fenwal, Inc.) and/or a data store.

At block 412, the method 400 determines whether or not the procedure is complete. The procedure may be complete based on a variety of factors. Some of the factors may include a duration during which the user has participated in this particular training exercise (e.g., how long the user has shaken the mobile device to simulate resuspending the platelets), a vigor and/or strength at which the user has shaken the mobile device and/or if sufficient platelets would have been removed from the walls of the centrifuge receptacle based on the users actions.

If the method 400 determines that the procedure is not yet complete, control moves back to block 408. However, if the method 400 determines that procedure is complete, control moves to block 414 and additional feedback may be provided. Some of the feedback may include critiques of the user's performance, a comparison between the user and other users, etc.

At block 416, the method 400 determines if further action is to be taken. The further action may include additional sessions and/or portions of a tutorial on the blood collection device, the blood processing device, etc. If further action is to be taken, control moves to block 418. At block 420, the method 400 determines whether or not to return to block 404. Otherwise the example method 400 is ended.

In certain examples, the method 400 can also include displaying one or more photographs/images, diagrams, and/or instructions for proper kit loading for blood collection/processing instruments. In certain examples, access is provided to on-line operator manuals, error codes, and/or product information via keyword search. In certain examples, complaints can be submitted via photograph and/or barcode scan in place of or in addition to written submission. Barcode scanning of a product can retrieve a corresponding product complaint form pre-populated with product information. An application can be used to additionally pre-populate the complaint form with center information, date, time, complaint reference number, etc. In certain examples, an instrument trouble shooting decision tree can be provided to facilitate resolution of an instrument issue and/or submission of a service request.

Figure 5:
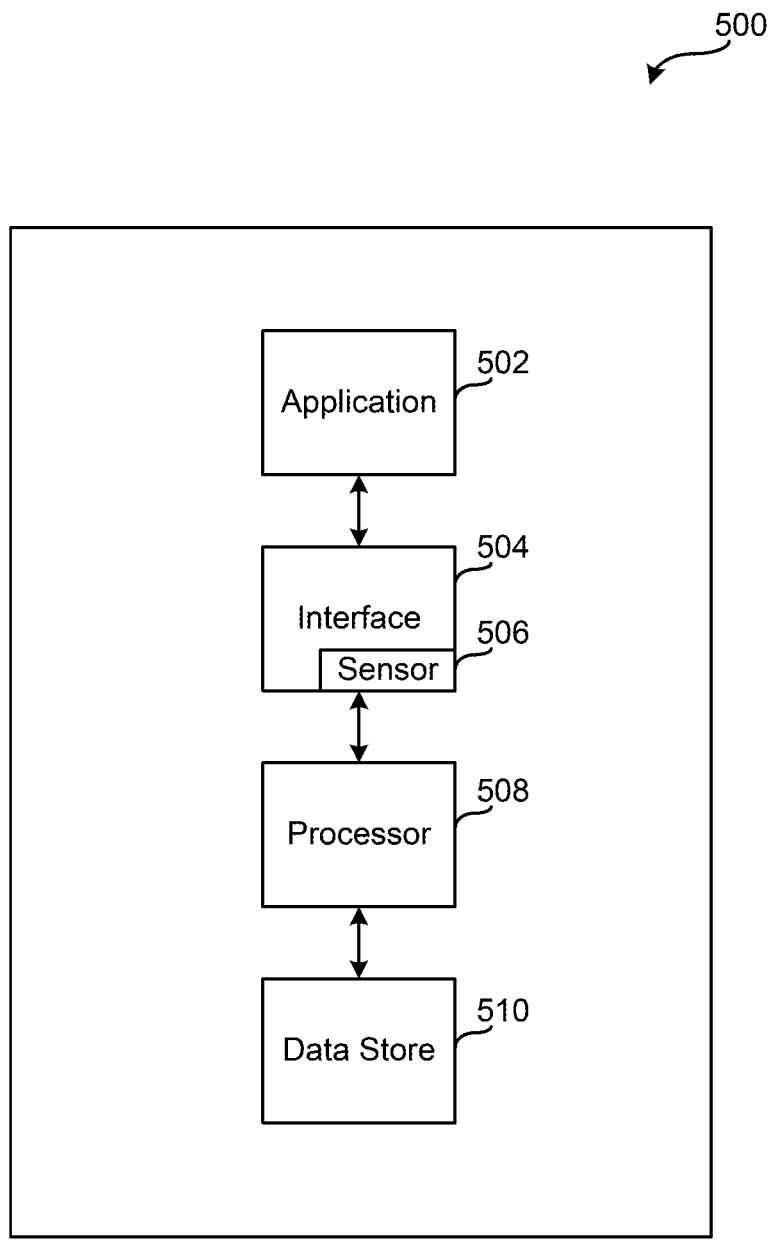
FIG. 5 is a block diagram of an example apparatus that may be used to implement the examples described herein.

FIG. 5 is a block diagram of an example system or mobile device 500 including an application 502, an interface 504 including a sensor(s) 506, a processor 508 and a data store 510. The example system 500 may be used to implement the example mobile device 100. While an example manner of implementing the mobile device 100 of FIG. 1 has been illustrated in FIG. 5, one or more of the elements, processes and/or devices illustrated in FIG. 5 may be combined, divided, re-arranged, omitted, eliminated and/or implemented in other ways.

The application 502, the interface 504, the sensor 506, the processor 508 and/or the data store 510 and, more generally, the example system 500 may be implemented by hardware, software, firmware and/or a combination of hardware, software and/or firmware. Thus, the application 502, the interface 504, the sensor 506, the processor 508 and/or the data store 510 and, more generally, the example system 500 can be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the application 502, the interface 504, the sensor 506, the processor 508 and/or the data store 510 and, more generally, the example system 500 are hereby expressly defined to include a tangible medium such as a memory, DVD, CD, Blu-ray, etc., storing the software and/or firmware. Further still, the example system 500 of FIG. 5 may include one or more elements, processes and/or devices in addition to, or instead of, those illustrated in FIG. 5, and/or may include more than one of any or all of the illustrated elements, processes and devices.

The application 502 may include instructions that, when driven by the processor 508, cause the processor 508 to retrieve data, tutorial information, audio, graphics, text, etc., and display the same using the interface 504. For example, based on the initiation of a tutorial session, the application 502 may cause a video to be displayed on the interface 504 on how to properly resuspend platelets contained within a centrifuge receptacle. The application 502 may cause instructions to be displayed on the interface 504 on how to participate in the tutorial. In some examples, based on the system 500 identifying the user's experience level, a different tutorial and/or information may be displayed. The system 500 may identify the user's experience level from data stored at the data store 510 and/or based on input received from the user.

The application 502 may instruct the user, using the interface 504, to simulate a procedure in which platelets are resuspended using the system 500. These instructions may include instructing the user to shake the system 500 from side to side at a particular rate, with a particular strength, with a particular vigor, for a particular amount of time, etc. The user may then begin in the moving the system 100 based on the instructions received. Once the sensor 506 identifies movement of the system 500 (or optionally the placement of the user's hands on the system 500), the sensor 506 may generate feedback and provide the same to the processor 508 and/or the data store 510. The sensor 506 may be implemented as multiple sensors providing separate sensory data (e.g., a motion sensor such as an accelerometer, a touch sensor, a position sensor, etc.). The feedback may be related to the speed at which the user is moving the system 500, the intensity at which the system 500 is being moved, the position of the user's hands on the system 500, how the user is holding the system 500, etc.

Based on the information received, the processor 508 may generate feedback that may be displayed at the interface 504 and/or stored at the data store 510. The feedback displayed may be encouragements indicating that the user is properly moving the system 500, tips that enable the user to finish the platelet resuspension procedure quicker, etc. Once the processor 508 determines that the tutorial is complete, the processor 508 may generate feedback relating to the user's performance, etc. While the data store 510 is depicted as being within the system 500, the data store 510 may be at a different location (e.g., a remote location).

The processor 508 may drive the interface 504 to provide information and/or functionality to the user. In some examples, the interface 504 may be configured as a graphical user interface (GUI). The GUI may be touch pad/screen integrated with the system 500. The system 500 may include one or more internal memories and/or data stores including the data store 510. Data storage can include any variety of internal and/or external memory, disk, remote storage communicating with the system 500.

Figure 6:
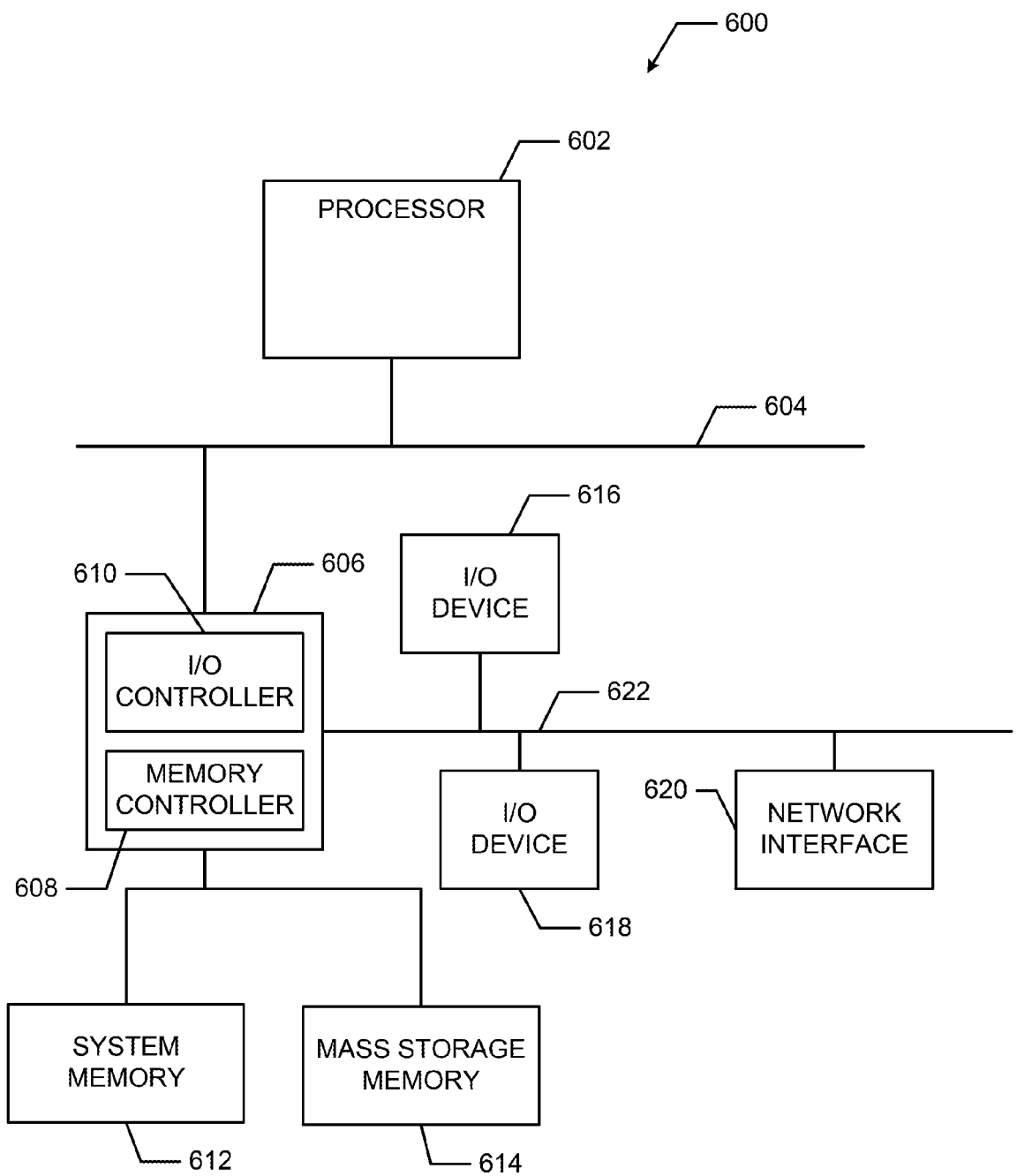
FIG. 6 is a schematic illustration of an example processor platform that may be used and/or programmed to implement any or all of the example methods and systems described herein.

FIG. 6 is a block diagram of an example processor system 600 that may be used to implement, control and/or drive the systems and methods described herein. As shown in FIG. 6, the processor system 600 includes a processor 602 that is coupled to an interconnection bus 604. The processor 602 may be any suitable processor, processing unit or microprocessor. Although not shown in FIG. 6, the processor system 600 may be a multi-processor system and, thus, may include one or more additional processors that are identical or similar to the processor 602 and that are communicatively coupled to the interconnection bus 604.

The processor 602 of FIG. 6 is coupled to a chipset 606, which includes a memory controller 608 and an input/output (I/O) controller 610. As is well known, a chipset typically provides I/O and memory management functions as well as a plurality of general purpose and/or special purpose registers, timers, etc. that are accessible or used by one or more processors coupled to the chipset 606. The memory controller 608 performs functions that enable the processor 602 (or processors if there are multiple processors) to access a system memory 612 and a mass storage memory 614.

The system memory 612 may include any desired type of volatile and/or non-volatile memory such as, for example, static random access memory (SRAM), dynamic random access memory (DRAM), flash memory, read-only memory (ROM), etc. The mass storage memory 614 may include any desired type of mass storage device including hard disk drives, optical drives, tape storage devices, etc.

The I/O controller 610 performs functions that enable the processor 602 to communicate with peripheral input/output (I/O) devices 616 and 618 and a network interface 620 via an I/O bus 622. The I/O devices 616 and 618 may be any desired type of I/O device such as, for example, a keyboard, a video display or monitor, a mouse, etc. The network interface 620 may be, for example, an Ethernet device, an asynchronous transfer mode (ATM) device, an 802.11 device, a DSL modem, a cable modem, a cellular modem, etc. that enables the processor system 600 to communicate with another processor system.

While the memory controller 608 and the I/O controller 610 are depicted in FIG. 6 as separate blocks within the chipset 606, the functions performed by these blocks may be integrated within a single semiconductor circuit or may be implemented using two or more separate integrated circuits.

Certain examples can include processes that can be implemented using, for example, computer readable instructions that can be used to facilitate mobile blood applications for donors, operators, administrators, and/or providers. The example processes can be performed using a processor, a controller and/or any other suitable processing device. For example, the example processes can be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes can be implemented using coded instructions (e.g., computer readable instructions) stored on a non-transitory computer readable medium such as a flash memory, a read-only memory (ROM), a random-access memory (RAM), a CD, a DVD, a Blu-ray, a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes can be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes can be implemented manually or as any combination(s) of any of the foregoing techniques, for example, any combination of firmware, software, discrete logic and/or hardware. Further, although example processes may be described with reference to a particular order and/or structure, other methods of implementing the processes may be employed. For example, the order of execution of the blocks can be changed, and/or some of the blocks described may be changed, eliminated, subdivided, or combined. Additionally, any or all of the example processes can be performed sequentially and/or in parallel by, for example, separate processing threads, processors, devices, discrete logic, circuits, etc.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

The invention claimed is:

1. A computer-implemented method of training an operator for platelet resuspension, the method comprising:
providing an interactive training application via a mobile device to train a user to resuspend platelets in a liquid medium prior to its storage and/or transfusion to a patient, the training application to instruct the user regarding an appropriate motion and vigor for resuspension of platelets in a blood container associated with a blood processing instrument;
detecting, using a sensor, the user's motion of the mobile device;
comparing the user's motion of the mobile device to the appropriate motion and vigor for resuspension of platelets in a blood container; and
providing feedback to the user regarding the comparison.

2. The method of claim 1, wherein the interactive training application is configured to teach the user regarding a function and operation of the blood processing instrument.

3. The method of claim 1, wherein the detecting further comprises detecting the user holding an edge of the mobile device to mimic holding the blood container taut and detecting the user shaking the blood container back and forth to detach and resuspend platelets in the blood container.

4. The method of claim 3, wherein the detecting further comprises detecting the user's positioning of hands on the mobile device so as to at least one of rub the blood container or pinch at least one corner of the blood container.

5. The method of claim 1, wherein the detecting further comprises detecting at least one of a direction and an intensity of user movement of the mobile device.

6. The method of claim 1, wherein the detecting further comprises detecting a type of motion performed by the user with respect to the mobile device.

7. The method of claim 1, further comprising visually displaying, via the mobile device, a progress of platelets being resuspended.

8. The method of claim 1, further comprising facilitating setting of a sensitivity of the sensor to identify movement of the mobile device by the user.

9. The method of claim 1, wherein the training application is provided as a game that advances based on the user's progress to resuspend the platelets.

10. The method of claim 1, further comprising displaying information relating to suggestions for the user regarding resuspension of platelets.

11. The method of claim 1, further comprising displaying feedback for the user based on a stage of platelet resuspension.

12. The method of claim 1, wherein the comparing further comprises comparing a performance of the user to a performance of at least one other user.

13. A system for platelet resuspension training, the system comprising:
an interactive training application, provided via a mobile device, to train a user to resuspend platelets in a liquid medium prior to its storage and/or transfusion to a patient, the training application to instruct the user regarding an appropriate motion and vigor for resuspension of platelets in a blood container associated with a blood processing instrument;
a sensor to detect the user's motion of the mobile device; and
a processor to compare the user's motion of the mobile device to the appropriate motion and vigor for resuspension of platelets in a blood container and provide feedback to the user regarding the comparison.

14. The system of claim 13, wherein the interactive training application is configured to teach the user regarding a function and operation of the blood processing instrument.

15. The system of claim 13, wherein the sensor is to detect the user holding an edge of the mobile device to mimic holding the blood container taut and detect the user shaking the blood container back and forth to detach and resuspend platelets in the blood container.

16. The system of claim 15, wherein the sensor is to detect the user's positioning of hands on the mobile device so as to at least one of rub the blood container or pinch at least one corner of the blood container.

17. The system of claim 13, wherein the sensor is to detect at least one of a direction and an intensity of user movement of the mobile device.

18. The system of claim 13, wherein the sensor is to detect a type of motion performed by the user with respect to the mobile device.

19. The system of claim 13, wherein the processor is to visually display, via the mobile device, a progress of platelets being resuspended.

20. The system of claim 13, wherein the processor is to facilitate setting of a sensitivity of the sensor to identify movement of the mobile device by the user.

21. The system of claim 13, wherein the training application is to be provided as a game that advances based on the user's progress to resuspend the platelets.

22. The system of claim 13, wherein the processor is to facilitate display of information relating to suggestions for the user regarding resuspension of platelets.

23. The system of claim 13, wherein the processor is to facilitate display of feedback for the user based on a stage of platelet resuspension.

24. The system of claim 13, wherein the processor is to compare a performance of the user to a performance of at least one other user.

25. A tangible computer readable storage medium including program code for execution by a processor, the program code, when implemented, is to provide:
an interactive training application, provided via a mobile device, to train a user to resuspend platelets in a liquid medium prior to its storage and/or transfusion to a patient, the training application to instruct the user regarding an appropriate motion and vigor for resuspension of platelets in a blood container associated with a blood processing instrument; and
a processor to receive information regarding the user's motion of the mobile device from a sensor and to compare the user's motion of the mobile device to the appropriate motion and vigor for resuspension of platelets in a blood container and provide feedback to the user regarding the comparison.

26. The computer readable medium of claim 25, wherein the interactive training application is configured to teach the user regarding a function and operation of the blood processing instrument.

27. The computer readable medium of claim 25, wherein the processor is to receive information from the sensor to detect at least one of a direction and an intensity of user movement of the mobile device.

28. The computer readable medium of claim 25, wherein the processor is to receive information from the sensor is to detect a type of motion performed by the user with respect to the mobile device.

29. The computer readable medium of claim 25, wherein the processor is to visually display, via the mobile device, a progress of platelets being resuspended.

30. The computer readable medium of claim 25, wherein the processor is to facilitate setting of a sensitivity of the sensor to identify movement of the mobile device by the user.

31. The computer readable medium of claim 25, wherein the training application is to be provided as a game that advances based on the user's progress to resuspend the platelets.

32. The computer readable medium of claim 25, wherein the processor is to facilitate display of information relating to suggestions for the user regarding resuspension of platelets.

33. The computer readable medium of claim 25, wherein the processor is to facilitate display of feedback for the user based on a stage of platelet resuspension.

34. The computer readable medium of claim 25, wherein the processor is to compare a performance of the user to a performance of at least one other user.

* * * * *